(12) United States Patent
Pollakowski et al.

(10) Patent No.: US 8,831,587 B2
(45) Date of Patent: Sep. 9, 2014

(54) MANAGING A NETWORK ELEMENT

(75) Inventors: Olaf Pollakowski, Berlin (DE);
Henning Sanneck, München (DE)

(73) Assignee: Nokia Solutions and Networks Oy,
Espoo (FI)

( * ) Notice: Subject to any disclaimer, the term of this patent is extended or adjusted under 35 U.S.C. 154(b) by 722 days.

(21) Appl. No.: 12/736,548

(22) PCT Filed: Apr. 14, 2009

(86) PCT No.: PCT/EP2009/054413
§ 371 (c)(1),
(2), (4) Date: Feb. 28, 2011

(87) PCT Pub. No.: WO2009/127631
PCT Pub. Date: Oct. 22, 2009

(65) Prior Publication Data
US 2011/0143743 A1 Jun. 16, 2011

(30) Foreign Application Priority Data
Apr. 16, 2008 (EP) .................................... 08007454

(51) Int. Cl.
*H04W 4/00* (2009.01)
*H04L 12/24* (2006.01)
*H04L 29/08* (2006.01)

(52) U.S. Cl.
CPC ............. *H04L 41/0856* (2013.01); *H04L 41/16* (2013.01); *H04L 41/082* (2013.01); *H04L 67/22* (2013.01)
USPC ..... 455/422.1; 455/560; 455/561; 455/435.1; 455/418; 455/425; 455/466

(58) Field of Classification Search
USPC ............................ 455/422.1, 560, 561, 435.1
See application file for complete search history.

(56) References Cited

U.S. PATENT DOCUMENTS

| | | | |
|---|---|---|---|
| 7,529,821 B1 * | 5/2009 | Cannon et al. ................ | 709/223 |
| 2003/0095520 A1 | 5/2003 | Aalbers et al. | |
| 2005/0148368 A1 | 7/2005 | Scheinert et al. | |
| 2006/0148496 A1 * | 7/2006 | Zhu et al. ...................... | 455/466 |
| 2008/0096539 A1 * | 4/2008 | Moghaddam et al. ........ | 455/418 |
| 2008/0102820 A1 * | 5/2008 | Chang .......................... | 455/425 |
| 2008/0114862 A1 * | 5/2008 | Moghaddam et al. ........ | 709/220 |

OTHER PUBLICATIONS

"3GPP TR 32.816 V1.3.2 (Feb. 2008), 3$^{rd}$ Generation Partership Project; Technical Specification Group Services and System Aspects; Telecommunication Management; Study on Management of Evolved Universal Terrestrial Radio Access Network (E-UTRAN) and Evolved Packet Core (EPC) (Release 8)," Retrieved from the Internet at: http://www.3gpp.org/ftp/Specs/archive/32%5Fseries/32. 816/32816-132.zip, Feb. 2008, 40 pages.

(Continued)

*Primary Examiner* — David Q Nguyen
(74) *Attorney, Agent, or Firm* — Staas & Halsey LLP

(57) ABSTRACT

A method for managing a network element involves receiving via a first interface field data from a communication network. The field data is compared with available network status data such, that a difference between network status data and field data can be determined. A configuration data is generated such that the configuration data are adapted to align the network status data and the field data. Then, a corresponding network element for receiving the configuration data is determined and the configuration data is distributed via a first interface to a corresponding network element.

7 Claims, 5 Drawing Sheets

(56) References Cited

OTHER PUBLICATIONS

Henning Sanneck et al., "Network Element Auto-configuration in a Managed Network," Integrated Network Management, 2007, 10$^{th}$ IFIP/IEEE International Symposium on, May 1, 2007, pp. 497-515.
Frank Lehser, "Use Cases Related to Self-Organising Network. Overall Description." NGNM Alliance, Retrieved form the Internet at: http://www.ngmn-cooperation.com/fileadmin/content/documents/downloads/AnnexA_Informative_list_of_SON_Use_Cases_1_53.pdf, Apr. 16, 2007, 14 pages.
"Introduction of Automatic Neighbour Relation Function," Ericsson, Retrieved from the Internet at: http://www.3gpp.org/ftp/tsg_ran/WG3_lu/TSGR3_57bis/docs/R3-072014.zip, Sep. 11, 2007, 6 pages.
Extended European Search Report for EP 08007454.5, mailed on Sep. 18, 2008.
International Search Report for PCT/EP2009/054413, mailed on Jul. 31, 2009.

* cited by examiner

MANAGING A NETWORK ELEMENT

CROSS REFERENCE TO RELATED APPLICATIONS

This application is based on and hereby claims priority to International Application No. PCT/EP2009/054413 filed on Apr. 14, 2009 and European Application No. 08007454.5 filed on Apr. 16, 2008, the contents of which are hereby incorporated by reference.

BACKGROUND

1. Technical Field

The present invention relates to the technical field of communication networks. In particular the present invention relates to a method for managing a network element, a method for configuring a network element, a program element for managing a network element and/or for configuring a network element, a managing apparatus for the management of a network element and a network element.

2. Background

In many countries the penetration of mobile network services has reached a value which is significant. In some countries the penetration of mobile network services is reaching saturation. Therefore, mobile network operators (MNOs) are not only focusing on increasing the number of subscribers anymore. However, they try to increase their ARPU (average revenue per user).

From the document "Self-configuration and Self optimization of 4G Radio Access Networks", Ambrosy, A. et al., 29.08.2007, IEEE 802.16 Broadband Wireless Access Working Group a transition from conventional to self-x driven radio access network configuration is described.

The mobile network operators are also very interested in improving the cost position by reducing operational expenditure (OPEX). Particularly, in developed industrial countries, the cost of operating a network is dominated by the cost of the operation and maintenance, in particular by the cost of the operational personal.

SUMMARY

From the above, the desire exists to decrease the operational costs for a communication network.

Thus, a method for managing a network element, a method for configuring a network element, a program element for managing a network element and/or for configuring a network element, a managing apparatus and a network element is provided.

A method for managing a network element involves receiving via a first interface field data: The receiving of field data may include the receiving of such data that itself represent a request to deliver relevant data. The field data may be either just configuration data of the network element NE or an explicit request for specific configuration data. The specific configuration data may be gained due to data comparison which may already take place at the NE, i.e. if the network element NE detects via comparing that it should request an IP address.

The method further comprises comparing network status data, which may be stored in a database, and the field data such, that a difference between the network status data and the field data can be determined.

Configuration data then are generated such that the generated configuration data are adapted to align or allow aligning the network status data and the field data. Substantially, all network elements are determined, which may be affected by the generated new configuration. The configuration data for the corresponding network elements is generated and the generated configuration data is distributed to each of the affect network elements via the first interface.

Thus, as a result of the method a plurality of sets of configuration data may be generated. Each set of configuration may only take into account the amendments in the configuration which have to be conducted for the individual network element. Thus, the plurality of sets of configuration data, i.e. the content of each set of configuration data, may differ one to each other.

The field data may comprise data from the at least one network element. For example data related to frequency band of the at least one network element. Generally, field data is acquired from the network which is then used to generate the configuration data. In another example, the result of the comparison between the network status data and the field data may be that the network element may not have an assigned IPv4 address, e.g. the storage for the IPv4 address is "0.0.0.0". Thus, the configuration data may contain an IP address, which may allocate to the at least one network element, and which the network element NE may use for future communication.

The method may be a central function and thus, may have an overview of all IP address which may be assigned to network elements. Such a policy may be influenced by the number of IP address which IP addresses have been allocated for a certain mobile operator. However, in the range of the allocated IP addresses, the central method may be free to decide, which IP address may be assigned to which network element.

The range of IP addresses allocated to the mobile operator may be stored in a database, which may have been filled by a network planning tool.

Thus, one idea may be to provide to a central function, to a central functionality, a central task, a central method the frame requirements of the basic framework or the borders, within which the central function may decide on their own.

According to another aspect, a method for configuring a network element is provided, the method comprises receiving configuration data via a first interface from a management apparatus, setting up a link via the second interface to the management apparatus and receiving software via the second interface from the management apparatus. The method further comprises performing a self-test of the network element.

The configuration data comprise at least one of self-configuration parameters selected from the group of self-configuration parameters consisting of an IP address (Internet protocol address) of the network element, information about the IP environment of the network element, a frequency, a code, a physical cell identifier (PHY-CID), a global cell identifier (GCID), an adjacency, a radio configuration parameter for the network element, a mapping parameter from a physical cell identifier to a global cell identifier, mapping parameter of a global cell identifier to an IP address and a black list.

Which of these configuration parameters may be provided may depend on a difference between field data provided by a network element to a management apparatus and network status data stored in the management apparatus.

According to another aspect, a program element for managing a network element and/or for configuring a network element is provided the program element, when being executed by a processor is adapted to carry out at least one of the methods.

The program element may be realized as two separate program elements for each of the methods. Such a program element may be stored on a computer readable medium.

Furthermore, according to another aspect, a computer-readable medium is provided comprising a program code, which program code, when being executed by a processor, is adapted to carry out at least one of the methods.

Computer-readable medium may be a DVD (digital versatile disk), a CD-ROM (compact disk read only medium), a floppydisk, a harddisk or an USB stick:

According to yet another aspect, a managing apparatus for the management of a network element is described, wherein the managing apparatus comprises a receiving device, a configuration generating device and a distribution device. The generating device is connected to the receiving device and to the distributing device.

The receiving device is further adapted to receive field data via a first interface. The configuration generating device is adapted to compare network status data, which may be stored in a database of the managing apparatus, and the field data such, that a difference between network status data and field data can be determined. The configuration generating device is further adapted to determine a corresponding network element for receiving the configuration data.

A network element for receiving the configuration data may be a network element affected by the generated configuration.

The distributing device is adapted to distribute the configuration data via the first interface to a corresponding network element. In particular the distributing device is adapted to distribute the configuration data via the first interface to substantially all of the affected network elements.

According to another aspect, a network element comprising a receiving device and a configuration device is provided. The receiving device is connected to the configuration device. The receiving device is adapted for receiving a configuration data via the first interface from a management apparatus.

The receiving device is further adapted for receiving a software via the first interface from the management apparatus. The configuration device is adapted for setting up a link via the first interface to the management apparatus and the configuration device is further adapted for performing a self-test of the network element.

The configuration data comprises at least one configuration parameter selected from the group of configuration parameters consisting of an IP address of the network element, of information about the IP environment of the network element, of a frequency, of a code, of a physical cell identifier, of a global cell identifier, of an adjacency, of a radio configuration parameter for the network element, of a mapping parameter, of a mapping parameter from a physical cell identifier to a global cell identifier, of a mapping parameter of a global cell identifier to an IP address and a blacklist.

Network planning may comprise time-intensive work steps of analyzing an actual situation of a network status and preparing a new network design with regard to the may be amended environmental conditions. Such network planning task may require an enormous effort of human workload. The actual network status or actual network configuration may have to be analyzed. The environmental conditions may have changed and such changes may only detected by sophisticated measurement procedures like measurement of the signal strength in the field.

This human workload, which usually is used for network building and/or for network operation and maintenance, may be shifted into areas of the operation and maintenance process for a network, which areas are more sophisticated and profitable. Such areas may be the service management on a high network level or the marketing for network services. Another aspect may be the improvement of the overall quality of service within the network.

One possible solution for reducing the complexity of the operation and maintenance task may be to simplify the complexity of network elements, providing a simple design of system architecture and simplified components, e.g., simplified 3G LTE (third generation long-term evolution) network architecture and simplified system functions.

On the other hand in the network elements there may be implemented features, which reduce the complexity. Additionally the management systems may be designed such that the systems manage as standalone systems the complexity of modern networks. I.e. the standalone systems may handle simple recurring tasks within the network. A modern network may comprise a plurality of different types of network elements such as access points, routers, gateways, base stations etc.

The management systems may avoid errors induced by human operators, i.e. the management systems may assure autarkic or self-sustaining that the network is well-configured, optimized and substantially fault-free.

The investment in these features may lead to an increased CAPEX (capital expenditure) however they may be traded off against an achievable OPEX (operational expenditures). The OPEX may be reduced. The revenue protection for the network operator may be significant.

In particular, for a next generation mobile network (NGMN) a parallel operation of GSM (Global System for Mobile Communication), UMTS (Universal communications System) and NGMN is envisaged. It may be necessary to do this parallel operation with the same number of personnel as a conventional network. Furthermore, the introduction of new network elements like home base stations or femto access points may be challenging. These network elements may be part of a network infrastructure and may not be managed by tools known for the management of conventional macro base station due to the incurred OPEX.

Modern radio access networks (RANs) may require a more dynamic configuration. An method for managing a network element may allow such dynamic configuration. This method may allow a fast and efficient network rollout process substantially avoiding any long delays from ordering a base station to actual installation and a commissioning of a base station: A base station may be an example for a network element.

Since a new radio technology for base stations may reduce the size of a cell covered by the base station. Thus, the number of base stations to cover a certain area is increased. In order to cover the same area as with legacy equipment, deploying of modern base station may require increased configuration work load.

Other requirements, such as saving energy by switching capacity of base stations on and off as required, may require reconfiguring a network over the course of a day. In other words, future network configuration may allow individual user to operate own base stations. Such user may not be experienced in configuring a network. However, the number of such individual base station may increase. Such an increase of base stations may not be handable by conventional network management tools.

The user demand a network capacity corresponding to the user's desire. Thus, network operator who may allow to influence the network by the behaviour of individual user may need an intra-day reconfiguration of their network.

The method may also allow reconfiguring the network more often with respect to support of services or service management. This may allow the network operator reacting to changes within the network quicker than by involving a sophisticated planning task.

The method may also allow coping with new network elements like home base stations or femto base stations. Such new base stations may be inherently dynamic, i.e. they can be switched on and off at any time by an end customer and thus, the network configuration may require updates with respect to the femto base station itself or an adjacent femto base station and/or macro base station.

Thus, together with the trend towards realizing an OPEX reduction by automatization the method may allow a dynamic self-configuration of a RAN.

Thus, it may be seen as a gist that the method is self-learning with respect to the radio configuration of the network. A central element like the management apparatus may always have an up to date view on the relevant radio configuration data in the network.

Thus, the idea may be to centralize available information about the network configuration at a single network apparatus which manages between operational data and actual network configuration without substantially involving a feedback via a planning tool. The network planning frame work may be stored in a central data base.

Delivery of data for a planning tool may increase the reaction time with respect to producing or generating a network configuration which reflects the actual situation within the network. Such a process, involving a planning tool or involving human planning activity may increase the reaction time.

Delivery of field data for a central dynamic self-learning planning function may reduce the reaction time with respect to producing or generating a network configuration which reflects the actual situation within the network.

Having the network view on a central information database and receiving changes of the network may allow reacting quickly to such changes and providing an up to date configuration. Involvement of human work load may be avoided. The central network management apparatus may calculate amended configuration data with respect to previously provided planning data very quickly within the frame work provided by a planning database.

Thus, it may be seen as an idea of the proposed methods and devices to move as much function of the network planning task into a single apparatus or a single device located centrally in the network, in order to perform the parts of the network configuration. The single network apparatus may work as a standalone device. In other words, results of a long-term network planning may be stored in a data base or in a centralized dynamic network management apparatus. The network apparatus may access such centrally stored planning data, receive configuration data reflecting the actual network configuration, comparing or correlating the configuration data with the planning data and provide configuration data to network elements which are affected by the amended configuration.

Thus, the network element and the network management apparatus or the management apparatus may form a closed loop regulation. The desired value for the overall or high level network design or network plan may be provided via a second interface to the management apparatus. The second interface may be connected to a database of planning data.

The actual present configuration of the network may be received within the network apparatus as an instantaneous value. The management apparatus may determine the difference between the instantaneous value and the desired value and provides a configuration via the first interface to the network element or to a plurality of affected network elements in order to minimize the difference between the instantaneous value and the desired value. Thus, the actual network configuration may be adapted to the desired value or the desired overall network plan.

Thus, a substantially stable condition within the network can be achieved. The actual network configuration or the actual configuration of the individual network elements may be aligned with the high level network planning. And thus, the network configuration may be adapted to the actual situation within the network, for example to an actual situation which may be changed by switching on and off of different network elements.

Thus, dynamic may mean to quickly react to changes within a network and may mean pre-operational and operational self-configuration in RANs. The pre-operational configuration takes place before the network element goes online, and the operational configuration takes place during routine operation. Some functions takes place preferably only during the pre-operational phase, as i.e. the assignment of an IP address, while other functions as i.e. the neighborship assignment may take place during both phases.

The implementation of dynamic self-configuration within a RAN may allow reacting to an amended situation within the network, wherein configuration parameters change with high frequency. Conventional full configuration work cycle with reaction time of typically days may not be fast enough to react to such quickly changing conditions. Time would be consumed in a conventional configuration cycle by retrieving configuration data from network elements, by static radio re-planning, by involving manually operated planning tools, and by preparation and roll out of new configurations. Such configuration may have to be manually employed within the network elements.

Static radio re-planning may happen offline, i.e. re-planning may be independent from the network itself. For re-planning may be standalone measurement tools are used for measuring the cell coverage. The coverage data may be assessed by a network planner in order to define a new network configuration. Such a conventional full configuration work cycle may take very long and may incur much human workload.

Retrieving configuration data from network elements may also be known by alignment.

The conventional full configuration work cycle, comprising preplanning according to a fixed network plan, and information distribution via OAM (operation, administration and maintenance) mechanism may be a form of centralized and static planning. In other words, the conventional planning configuration work cycle may be performed centralized at a single planning office but it may be a static process which does not allow reacting very quickly to an amended network situation.

Dynamic self-configuration may also be realized in a substantially fully distributed way. However, in an infrastructure network still some interaction with planning information may be required. Distributing information over the network and in a plurality of different location may increase the complexity compared with keeping a network overview at a single centralized place within the network.

Furthermore, dynamic self-configuration may also require interworking on OAM level. In a fully distributed mechanism complexity may be increased because the dependencies between network elements may be difficult to address and some convergence to a decision may need to be reached. In other words, in order to find a solution respecting all aspects of an actual situation a single point in the network, which has the overview of the network, may allow generating a configuration very quickly and may help reducing a difference in the network configuration.

The present proposed methods and devices may be a centralized dynamic ("self-planning"/"self-configuration") solution. A dynamic distributed solution may be the distribution of information by a control plane mechanism e.g. in LTE message exchange via X2 for configuration Generally, the network element NE may be able to directly exchange information for the distributed dynamic solution.

Dynamic may refer to the property of a function or a method for managing a network element may be operating an actual information learned dynamically. Thus, the proposed methods and devices may differentiate from static planning, which may not allow reacting quickly enough to an amended network configuration. Currently active base stations may be considered in the execution of the method or the "functions" instead of all base stations, which appear in the network plan. In other words, a network status related field data, i.e. which basestation is actually active, are used to generate the configuration data, rather than data related to static planning.

The method for managing a network element may also be named dynamic radio self-configuration function (dRSCF) or "function".

The application area of the dRSCF may be the self-configuration of new eNodeB (evolved node B, i.e. a base station defined in LTE concept). Self-configuration may mean the process, which is required after the physical installation of a new eNodeB in order to make the eNodeB fully operational (pre-operational self-configuration). The dRSCF function or the management apparatus may provide the radio configuration data for an eNodeB during the self-configuration of an eNodeB.

In the following further aspects of the method for managing a network element will be described. These aspects apply also for the method for configuring a network element, for the program element, for the managing apparatus and the network element.

According to another aspect the method further comprises receiving via a second interface planning data, determining a difference between network status data and planning data and generating network status data such, that the network status data correspond to the planning data.

The generated network status data may be new network status data or amended network status data.

Via the second interface connection to planning data may be established. The second interface may be a database interface. The planning data may provide information for an overall and high level planning. The planning data may be reduced to the number of data, which cannot be automatically generated. The planning data may be the desired value for the network.

The dRSCF or the method for managing a network element may be seen as a controller or a regulator, which receives feedback from the network via the first interface and which receives a desired value via the second interface. Thus, the dRSCF regulates or controls, respectively the configuration of the communication network or the configuration of the radio communication network.

The planning data may be data concerning the site planning, which may not be replaced by online mechanisms. Since the planning data may be stored on a database these data can automatically accessed by the method for managing a network element. The planning data may represent the desired value wherein the network status data may represent the actual value or instantaneous value of the network. The instantaneous value may be amended since for example a Femto cell or a home cell or any other base station may be switched off at any time.

According to another aspect the first interface is based on a different protocol than the second interface.

Interface in this context means any protocol according to any layer of the OSI layer model (Open Systems Interconnection Reference Model).

The first interface may be a protocol which allows connecting to a base station and in particular to an eNodeB. The second interface however may be an interface which allows connecting to a management system for example an element management system (EMS), a domain management system (DMS) or a network management system (NMS) or a radio network planning tool.

Providing those both interfaces, may allow to work as a middleware or a driver which provides a link between network equipment and network management systems like EMS, DMS and NMS.

According to another aspect the method is a central functionality.

As a central functionality, the method for managing the network element may at any time have an overview over the actual network configuration or the instantaneous network configuration. The method for managing a network element may at the moment of any changes, i.e. the switch off of a network element, be informed about the changes. Since the method for managing a network element a central functionality has the overview over the actual network configuration, the method may quickly react to such changes without substantially involving access to conventional planning tools.

The method for automatic generating configuration data like radio configuration data may allow to initially self-configure an eNodeB. In order to prepare a network element, in particular an eNodeB, or to communicate with a central method for managing the network element, the method may need to receive via the second interface planning data, which planning data may not be taken over from a planning task. In other words, the planning data received via the second interface may relate to planning data generated by an offline radio planning tool and stored in a data base. This may relate to information, which may not be automatically generated since such information may relate GEO locations (geographic locations).

According to another aspect the method for managing a network element is a central functionality.

Designed as a central functionality the method of managing a network element may sit in the middle of the information flow between network management systems and the network elements. Thus the method sits like a spider in the web in the middle of network management systems and network elements.

According to yet another aspect the method of managing the network element is executed online.

Online execution may mean that the method for managing a network element react without involvement of any human interaction to a change within the network configuration. Thus, the method for managing the network element may bypass substantially the network planning tool. Thus, operational personnel may not be involved in handling of changes in the network which changes may happen with a high frequency. The method may only indicate if further involvement of planning tools is required by triggering an indication like an alarm lamp or any other signal or flag. Such an alarm lamp may indicate to operational personnel to intervene. As long as no such alarm indication may raise, no interaction may be required and the method may operate online.

According to another aspect online comparing is at least one functionality selected from the group of functionalities consisting of dynamically resolving a configuration parameter and dynamically mapping a configuration parameter into another. Dynamically resolving a configuration parameter and dynamically mapping a configuration parameter into another may mean that radio configuration is prepared on request. In other words, radio configuration data may not be prepared by the operator using offline planning tools. Instead the radio configuration for the network element may be generated online during the self-configuration process.

According to another aspect the configuration data, which is distributed via the first interface comprises at least one self-configuration parameter selected from the group of self-configuration parameter consisting of an IP address of the network element, information about the IP environment of the network element, a frequency, a code, a physical cell identifier, a global cell identifier, an adjacency, a radio configuration parameter for the network element, a mapping parameter for a physical cell identifier to a global cell identifier, a mapping parameter of a global cell identifier to an IP address and a blacklist.

The method of managing the network element may allow generating the self-configuration parameters which are required in order to configure or reconfigure network elements for reducing the difference between a desired value of planning data and an instantaneous value of network status data. Information about the IP environment of the network element may allow informing a network element about neighbors. This information may allow a base station to identify the borders of a cell which the base station covers.

A frequency which is provided to a network element may allow sending the data in this particular network element in a frequency band without interfering neighbors or neighbor cells of this particular network element. Knowing the different possible frequencies, which may be used by a network element, may require an overview of all neighbor elements. Thus, a centralized method may be employed in order to provide the overview.

Furthermore, a code may similarly to a frequency be used in order not disturbing adjacent cells.

The physical cell identifier or global cell identifier distributed to a network element may allow identifying the network element within the network. For assigning a physical cell identifier or a global cell identifier for a network element may also an overview over the whole network and all assigned physical cell identifier or global cell identifier may be required.

The adjacency may comprise all information which a network element needs to know in order to communicate with neighbors or not to disturb neighbors with respect to e.g. frequency or code. Configuration parameter as radio configuration parameter for the network element may comprise the employed antenna type like omni-antenna or directional antenna, tilt or angular of an antenna. physical cell identifier, global cell identifier, power, handover parameters, A mapping parameter for a physical cell identifier to a global cell identifier may allow a network element to communicate with another network element. In order to communicate with another network element, a network element may have loaded a blacklist, which shows the network element to which other network element the network element is allowed to communicate. In order to save performance of the network element the functionality of a blacklist or any other functionality which may have to be conducted by the network element may be outsourced to the method for managing a network element. Thus, for example the method for managing a network element may also comprise to provide information about neighbor cells to which cells the network element may be allowed to communicate to.

According to another aspect the planning data comprise at least one planning parameter selected from the group of planning parameters consisting of a GEO location, a mobile country code in the mobile network code. the planning data comprise at least one planning parameter selected from the group of planning parameters consisting of data related to different network operators, data related to net domains inside an operator network, data related to global standards as data related to frequency bands determined for a specific operator.

Such information concerning planning parameters may be requested from the method for managing a network element from a database which stores such information as overall planning data.

The method for managing a network element may be seen as a method to operate a data repository or to operate a data warehouse, which repository allows the method for managing a network element to distribute information to places where such information may be required. In order to be able to generate a required radio data configuration, the method for managing a network element or a dRSCF may serve as such a repository administration tool for administrating data of a repository, which repository is generated by the method for managing a network element.

Field data about the actual configuration of a network may be reported from a network element to the method for managing the network element.

When a new network element may request radio configuration data from the method for managing a network element, the network element at the same time via the first interface may report a certain set of parameters which belong to the network element or which have been measured by the network element. In other words, the first interface may be operated bidirectionally. At the same time the network element may upload information to the dRSCF, the dRSCF may download radio configuration to the network element. The method for managing the network element or the dRSCF may store the data received from the network element. In the case that another eNodeB may request a radio configuration from the dRSCF, the dRSCF may use the information which have previously received by the first network element to generate the required configuration for the second network element.

According to another aspect the method runs on at least one level selected from the group of levels consisting of a network management level, of an element manager level, of a domain manager level and of a corresponding level running on a separate apparatus.

Running on a network management level may allow the dRSCF to communicate with a network management system. Running on an element manager level or a domain manager level may allow to communicate with an element manager or with a domain manager of a OAM system. Running on a corresponding level on a separate apparatus may allow running on a network management level, an element manager level or domain manager level without running on the corresponding same physical platform. Thus, the performance of the method for managing a network element may be increased.

Running on the network management level, on an element manager level or a domain manager level may allow the method for managing a network element running on a network management system, on an element manager or a domain manager. Sharing the hardware with such systems may allow reducing the hardware count within a network.

In the following further aspects of the method for configuring a network element will be described. These aspects apply also for the method of managing a network element, the program element, the managing apparatus for the management of a network element and the network element.

According to an aspect the method for configuring a network element comprises collecting of information, which information helps to determine a radio configuration parameter. The method further comprises providing the collected information via the first interface to the management apparatus.

The network element, in particular an eNodeB may perform measurements to measure environmental conditions. Such environmental conditions may be signal strength of user equipment.

User equipment may be a notebook, a PDA (personal data assistant), a mobile phone, etc. Measurement of a signal strength may allow to determine the coverage of the relevant network element.

For example, growing of plants in the area of network elements may change the conditions for the distribution of radio signals. Such information may be an interesting feedback for the network for managing a network element in order to adapt the actual situation of the network to a desired value according to planning data. In order to cope with attenuation caused by growing plants, the signal strength of the network element may be increased. The framework within such signal strength may be increased, may be regulatory requirements for a country.

Information, which may help to determine a radio configuration parameter may be measurement data, which may be measured by the network element or by a corresponding mobile unit.

According to another aspect the method for configuring a network element comprises detecting changes of at least one configuration parameter, i.e. a radio configuration parameter, and providing information about the change to the management apparatus.

Detecting a change in an environmental condition, i.e. a change of a radio configuration parameter may allow a central functionality method which is located centrally and has an overview of the complete network to adapt the radio configuration parameters for an individual network element or also for adjacent network elements. Providing the information about the change to the management apparatus immediately after detecting the change may allow quickly react to such an amendment on an online basis without involvement of any further network planning activity.

According to another aspect the method of configuring the network element comprises detecting the desire to establish a neighborhood to another network element and requesting the management apparatus for allowance of the establishment of the neighborhood.

Requesting the management apparatus for allowance may allow the network element to reduce performance used for such look up decision since the management apparatus provides the information whether an establishment of a connection to a neighbor network element may be possible.

Permitting OF such establishment of neighborship may be based on a blacklist which is administrated in the management apparatus.

In the following further aspects of the managing apparatus will be described. These aspects apply also for the method of managing a network element, the method for configuring a network element, the program element, and the network element.

According to another aspect the receiving device of the managing apparatus is further adapted to receive via second interface planning data. The configuration generating device is further adapted to determine a difference between network status data and planning data and the configuration generating device is adapted to generate network status data such, that the network status data correspond to the planning data.

In other words, the managing apparatus may generate configuration data for the corresponding affected network elements, which configuration data when configured on the corresponding network element, reduce the difference between network status data and the planning data.

According to another aspect the managing apparatus is a central server. On such a central server a dRSCF may be executed.

According to another aspect the first interface is adapted to be connected to at least one of the interfaces selected from the group of interfaces consisting of an interface of a NodeB, an interface of an eNodeB, a Itf-N interface, a Itf-S interface and a Iff-P2P interface. An Itf-N interface is the standardized management interface which is northbound in view of an element manager device, and an Itf-S interface is the non-standardized management interface which is southbound viewed from an element manager device in the direction of the network element NE.

The second interface is adapted to be connected to at least one interface selected from the group of interfaces consisting of a network planning tool interface, a network management system interface and an element management system interface.

In the following a further aspect of the network element will be described. This aspect applies also to the method of managing a network element, the method of configuring a network element, the program element, the managing apparatus for the management of a network element.

According to an aspect the network element is at least one network element selected from the group of network elements consisting of a base station, a NodeB, an eNodeB, a home base station and a Femto access point.

It has also to be noted that embodiments and aspects of the invention have been described with reference to different subject-matters. In particular, some embodiments have been described with reference to apparatus type claims whereas other embodiments have been described with reference to method type claims. However, a person skilled in the art will gather from the above and the following description that unless other notified in addition to any combination features belonging to one type of subject-matter also any combination between features relating to different subject-matter in particular between features of the apparatus claims and the features of the method claims is considered to be disclosed with this application.

These and other aspects will become apparent from and elucidated with reference to the embodiments described hereinafter.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
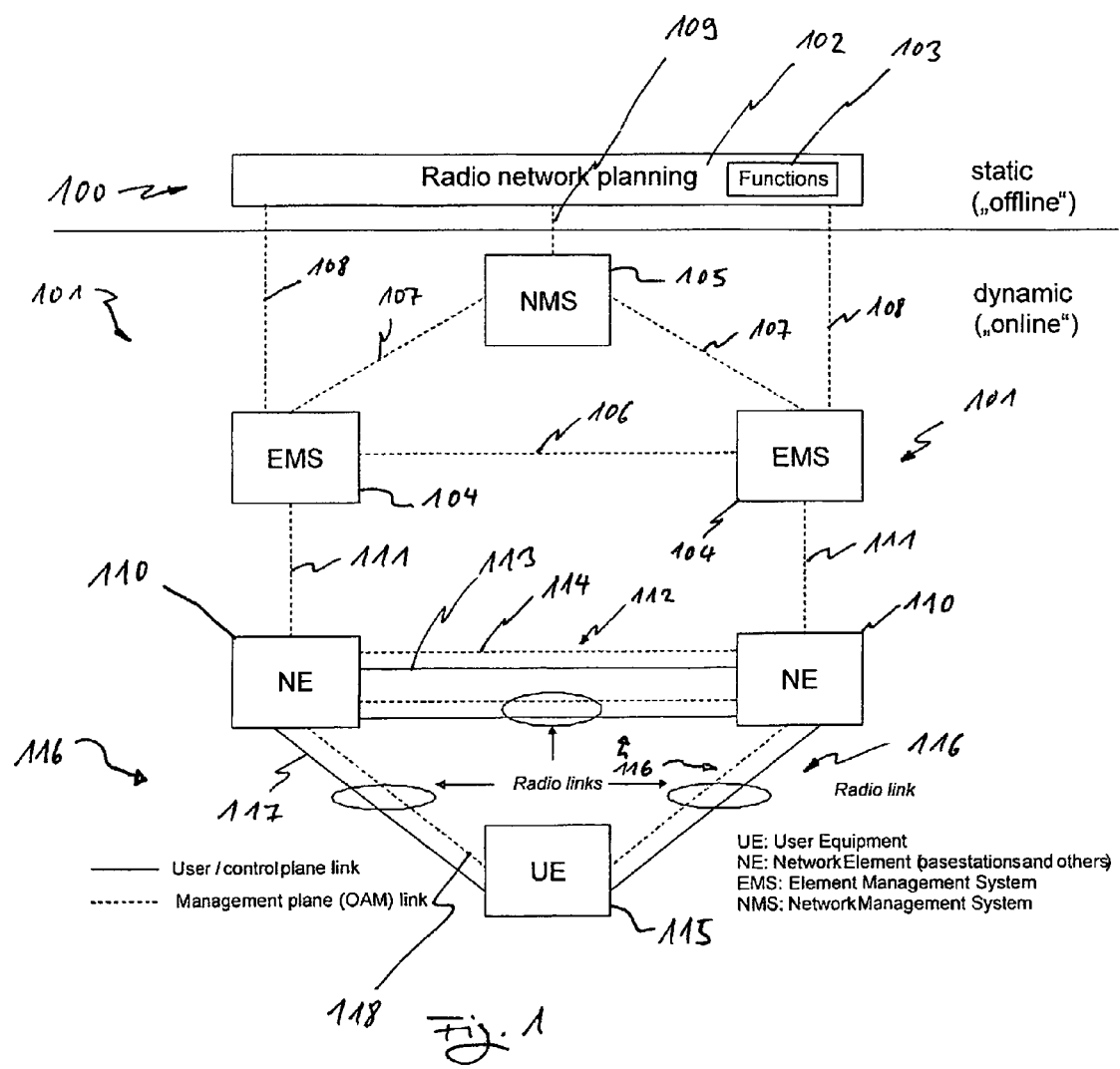
FIG. 1 shows a network/operation and maintenance architecture for a better understanding of the proposed methods and devices.

Reference will now be made in detail to the preferred embodiments of the present invention, examples of which are illustrated in the accompanying drawings, wherein like reference numerals refer to like elements throughout.

The illustration in the drawings is schematic. In different drawings, similar or identical elements are provided with the same reference numerals.

FIG. 1 shows a network and/or OAM (operation, administration and maintenance) architecture for a better understanding of the proposed methods and devices.

In FIG. 1 the static area 100 and the dynamic area 101 are differentiated. The static area comprises a radio network planning 102 tool. The functions 103 are shown included in the network planning tool 102. The planning tool 102 contains a relevant data generation and processing functions which is executed offline. Offline means that the functions of the block called function 103 are executed offline. In other words, the offline functions are only executed in certain time intervals, which are decoupled from the element management process 104 and from the network management process 105.

In FIG. 1 two element management systems 104 are depicted which are connected with each other by link 106. The element management systems 104 are connected to a network management system 105 by link 107. The element management system 104 is also connected directly to the network planning 102 by link 108. The network management system 105 is connected to the radio planning tool 102 by link 109.

The network management system 105 and element management system 104 is located in the dynamic area 101 of FIG. 1. In other words, network management system 105 and the element management system 104 responds to a request of network elements 110. In FIG. 1 two network elements 110 are depicted.

The network elements (NE) 110 are connected to the element management system (EMS) 104 by link 111. The both NE are connected by radio links 112 which each comprise a user plane 113 in the control plane 114. The radio link 112 furthermore comprises a management plane (OAM) link.

Connected to each NE is a user equipment (UE) 115 via a radio link 116. Each radio link 116 comprises a user/control link 117 and a management plane (OAM) link 118.

Since the functions 103 are located within radio network planning tool 102 no dynamic self-configuration function may be provided by the configuration as of FIG. 1.

Figure 2:
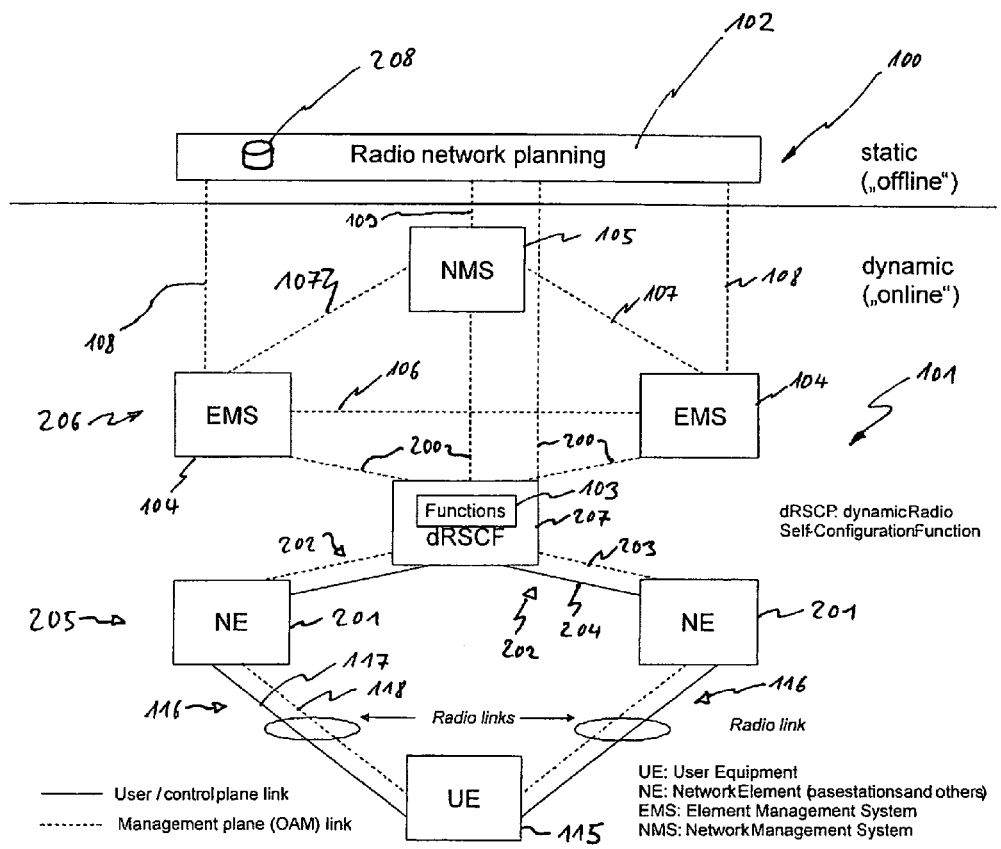
FIG. 2 shows a network/operation and maintenance architecture comprising a method for managing a network element according to an exemplary embodiment.

In difference to FIG. 1, FIG. 2 shows a network and/or OAM architecture according to an exemplary embodiment. In FIG. 2 the functions 103 or dRSCF (dynamic radio self-configuration function) 103 is located in a central position within the dynamic (online) area 101. In order to communicate with network planning 102 and NMS 105 and EMS 104 a second interface 200 is introduced in order to connect the dRSCF 103 with EMS 104, NMS 105 and radio network planning tool 102.

Via the second interface 200 the dRSCF may access a database 208 which stores desired values for the overall and high level network planning. In combination with this database 208 the dRSCF may be used as a data warehouse which has the complete information over the network including the new network equipment 201 which for example is an eNodeB. For storing information about the hole network, the dRSCF may also has a database, which is not shown in FIG. 2.

The new network equipment is adapted to communicate with the dRSCF 103. In other words, the new network equipment 201 may implement a method for configuring a network element 201 which fits to the method executed by the dRSCF 103. The network element may be a base station 201 or any other network equipment 201 for communicating with user equipment 115. For example the user equipment 115 is a mobile phone 115.

The network equipment 201 is connected to user equipment 115 via radio links 116. These radio links 116 again comprise the user/control plane link 117 (solid lines) and the management plane (OAM) link 118 (dashed lines).

The radio link 116 is a bidirectional link which allows to exchange data between NE 201 and UE (user equipment) 115. For example, via radio link 116 information of signal strength at user equipment's location may be transferred to the NE 201. Such information detected from the user equipment 115 can be provided via the first interface 202 to the dRSCF 103. The first interface 202 also comprises a management plane (OAM) link 203 and a user/control plane link 204. Again the radio link 202 or first interface 202 is a bidirectional link which allows at the same time sending configuration parameter or radio control parameter from the dRSCF 103 to the NE 201 and measured parameters from the NE 201 to the dRSCF 103. The measured parameters are either gathered from the NE 201 directly or received by NE 201 from the UE 115.

As can be seen in FIG. 2 how an information transfer between NE 201 and EMS 104, NMS 105 or radio network planning 102 is directed via the dRSCF 103. The dRSCF has a central position within the dynamic area 101. Therefore, dRSCF has an overall view or high level view of actual configuration 205 within the network and about the network planning data 206 provided from network planning 102 or network management 105, 104.

FIG. 2 shows a logical architecture. This logical architecture comprises the network element NE 201, for example an eNodeB 201, the radio network planning tool 102 and the dynamic radio self-configuration function (dRSCF) 103.

The dRSCF 103 executes the "functions" which may not necessarily have to be performed by the radio network planning tool 102. These functions 103 in FIG. 2 are moved to the dRSDF 103 and may be executed on a dedicated server dSCS 207 (dynamic self-configuration server).

Since the functions 103 have now been moved to the central block 207 or the dSCS 207, the functions 103 which are located in the dynamic area 101 can now be executed dynamically ("online"). In other words, the functions 103 now can be executed on demand or as required.

For example, the functions can be executed at the moment when a new eNodeB 201 is installed. Radio network planning intervals thus, now have not to be respected anymore. Just in time at the moment when a new eNodeB 201 will be installed, the functions 102 react to this new scenario and provide a corresponding configuration individually for the affected network elements 201. The corresponding configuration is not only provided to the new eNodeB 201. The amended configuration is also provided to every NE 201 which may be affected by the addition of a new eNodeB.

Furthermore, since the functions 103 are executed dynamically, the function 103 can operate on actual information which may have been learnt dynamically from the network elements 205. In other words, currently active base stations 205, 201 are considered by the function 103 instead of all NEs which appear in the network plan. Thus, in a static scenario base stations 201 which are in a network plan but which actually are not active, which are out of order or which are defective or just switched off. Such NE 201 may have no influence on the actual network configuration. If a network element 110 fails the area covered by that base station may be not supplied for the time the base station is defective. Thus, a replanning has to be conducted or the base station will be repaired.

However, the dynamic configuration and the dynamic self-learning function 103 could as soon as a base station disappears for any reason react to this new situation. Thus, the central function 103 will access the neighborhood condition and may try to react to cover the area of the switched off base station by increasing the power of neighbor base stations for example. If for example the tilt of an antenna may be automatically adaptable by another automatic adaptation device like an electric motor, the central function 103 may also try to adapt the tilt of the antenna in order to supply the cell with other base stations. Thus, a self-learning and self-maintaining whole network can be implemented.

Self-configuration is conducted after physical installation of a new eNodeB 201 to make the eNodeB 201 fully operational (pre-operational self-configuration). The dRSCF 103 provides the radio configuration data during this process.

During the self-configuration a new eNodeB 201 performs the following steps. After installation the eNodeB 201 will ask for an IP address from the dRSCF. Therefore, the dRSCF 103 may also conduct DHCP (Dynamic Host Configuration Protocol) functionalities but with additional functionalities. It is important in one aspect that the eNodeB may provide field data, that may be learned and processed from the dRSCF.

Once the eNodeB 201 has an IP address, a communication to the eNodeB 201 may be established via the first interface 202. Thus, the eNodeB gets via the first interface 202 information about the IP environment of the eNodeB 202. For example, the eNodeB 201 will receive information about the neighbors of eNodeB 201. Furthermore, the eNodeB 201 sets up a link to the OAM systems via the dRSCF 103.

Once the eNodeB 201 has established an IP connection 202 to the dRSCF 103 the dRSCF 103 can download software to the eNodeB 201. For example, a possible functionality of the dRSCF 103 will be to administrate of different versions of base stations or of different types of base stations. These different types may have to be respected when an individual configuration data is prepared.

Once such a functionality has been implemented, without intervenience of human beings, the updated software can be distributed to the right type and the right version of the relevant network equipment 201.

After commissioning and installation of eNodeB 201, the eNodeB 201 performs some self-tests. The results of the self-test again will be distributed via the first interface 202 to the dRSCF 103, which assesses the result and may react to the results accordingly. Only in cases of heavy failure, the dRSCF signals via the management systems 104, 105, 102 that a crucial failure has occurred. Only in such a case operational personnel may react and repair the system.

Such an automatic self-configuration of a network node now makes it possible that an unexperienced person can install network equipment 201 like a home base station 201. The person who installs the home base station 201 may only have to switch on the base station 201 and the configuration will be executed by the base station 201 in combination with the dRSCF 103. The installation process is transparent for the person who just switches on the home base station.

After the basic configuration, which just makes the eNodeB 201 or the network equipment 201 operable, additional configuration has to be conducted before traffic can be carried on the network equipment 201. For example, radio configuration data has to be provided to the installed network equipment 201. This radio configuration data may not have to be prepared by an operator offline using planning tools.

Instead, the radio configuration data will be generated online by the dRSCF taking into account the neighborship and adjacencies of a network equipment 201, which network equipment 201 should be installed and the dRSCF 103 generates the configuration data online during the self-configuration process. The dRSCF 103 may assist the generation of the radio configuration data. The dRSCF 103 may access some data stored in a database 208 in order to know the overall concept like site planning data.

The preparation process of a network equipment 201 may comprise providing the dRSCF 103 with information from the remaining part of the offline planning tools 102 which may be stored in a database 208. Information which is required from a database 208 gives an overall planning desired value. Such information may comprise site planning data like a GEO location. Thus, only part of the radio data may be provided from the planning system 102.

The self-configuration procedure may comprise collecting information by the eNodeB 201 and providing this collecting information which may help the dRSCF 103 to determine the configuration parameters, i.e. radio configuration parameters, as i.e. frequency bands, and provide this information to the dRSCF 103 via the first interface 202. This information may include data about the eNodeB 201 which collects the information. For example, the information comprises information about the hardware and software, in particular about the firmware revision and the software revision of the hardware and the software of the network equipment 201. Furthermore, the information about the network equipment 201 can comprise GEO location information, i.e. GPS-information or the total number and/or location of adjacent basis stations, and the radio environment of the network equipment 201 (e.g. detected cells together with the identification of the detected cells).

Furthermore, the eNodeB 201 provides the collected information to the dRSCF 103 and thus, triggers the execution of certain functions on the dRSCF 103. In the case that not the complete set of radio configuration data has been generated by the planning system 102 the dRSCF may request missing information from the database 208.

The dRSCF 103 furthermore aggregates all the information which the dRSCF 103 has collected from the network equipment 201 or the database the database 208 to determine the radio configuration or radio configuration data for the corresponding network equipment 201 or eNodeB 201. Thus, the function of the dRSCF may be seen as providing a central function for generating the radio configuration data for the automatic generation of a radio configuration data for an added network equipment.

The radio configuration data or radio configuration parameters may be grouped to different classes. Each class is treated in a different way. Examples of the classes are radio parameters for which a default value is fully sufficient, i.e. such default values may not have to be provided while the preparation procedure or the self-configuration procedure. Only in very rare cases such default values have to be amended.

A second category of parameters are radio parameters for which a default value is fully sufficient for the initial operation of the radio interface. These parameters may allow to set up an initial communication between the NE 201 and the dRSCF 103 in order to provide the NE 201 with an IP address and an initial download. However, these parameters may have to be amended during operation. The quality of such initial values may only be sufficient in order to have an initial network setup or integration of the corresponding network element 201. From a performance perspective such values may not be the best values. However, the self-optimization or self-configuration during the operation of such a network equipment NE 201 can be used to provide a fine-tuning of the corresponding parameters and to optimize the parameters.

A third category may be radio parameters with certain geographical restrictions. In 2G (second generation, GSM, CDMA) a geographical restriction information may be the frequency. In 2G the frequency may define the area which is covered by a base station, i.e. the size of the cell. In 3G a geographic restriction parameter is a code and in LTE (long-term evolution) the physical cell identifier (PHY-CID) is a geographically restricted parameter.

A fourth category of parameters are parameters which still come from the database 208 and which originally are generated by a planning system. Such parameters provide the overall network configuration and provide the desired values for a network configuration. Such parameters are just relayed or forwarded by the dRSCF 103. In other words, such parameters are transferred to the network equipment 201 transparently without amendments by the dRSCF.

After the preparation process and the self-configuration process the radio configuration or radio configuration data may be available. The radio configuration which has been determined by the dRSCF 103 is then downloaded to the network equipment 201 or eNodeB 201 (via interface 202).

In order to be able to generate the required radio configuration data, the dRSCF 103 may also serve as a repository or data warehouse for the data, which data is generated by the dRSCF 103 or which data is reported from the NE 201 to the dRSCF 103.

When a new NE 201 requests a radio configuration data from the dRSCF 103 via the first interface 201, the network equipment 201 at the same time can report a set of own parameters or measured parameters to the dRSCF 103 via the first interface 201. The dRSCF 103 stores the data received via first interface 202 from the NE 201. When other network equipment requests configuration or radio configuration data from the dRSCF 103, the dRSCF 103 may use the information stored in the repository to generate the required configuration.

In order to ensure that the dRSCF 103 has always an up to date radio configuration, radio configuration data or an actual view on the real network comprising of network elements 201 in the network, each single network equipment 201, 205 has to provide information about changes or updates of the configuration to the dRSCF 103. In other words, as soon as an NE 201 realizes that a configuration in the network changes, for example that another network equipment 201 fails or is switched off, the network equipment 201 has to provide this information to the dRSCF 103, which then can update the repository of the dRSCF 103. Whenever a certain radio configuration parameter changes in an operating NE 201, this NE 201 sends a notification to the dRSCF 103.

The dRSCF 103 is thus self-learning with respect to radio configuration of the network. And the dRSCF 103 has always an up to date view on the relevant radio configuration data in the network.

From the perspective of an NE 201, in particular of eNodeB 201, which is adapted to fit to the self-configuration mechanism of the dRSCF 103 a pull mechanism has to be provided. In other words, network equipment 201 collects data in the environment of the network equipment 201. The NE 201 supplies the collected data to the dRSCF 103, triggers the dRSCF to execute certain update functions for generating radio configuration data or configuration data or receives the generated configuration data from the dRSCF 103. Such a pull mechanism differs from a conventional push mechanism which may be employed in a regular configuration work cycle triggered by offline network planning.

However, also a push mechanism may be implemented by the dRSCF 103. When a function concerns dependencies between nodes which did not initiate a pull mechanism, but a corresponding configuration will be provided by the dRSCF 103 and the dRSCF pushes also the configuration data to the NE 201. For example, to announce the presence of a new NE 201 to the neighbors of the new NE 201 this push mechanism will be used by the dRSCF 103.

Figure 3:
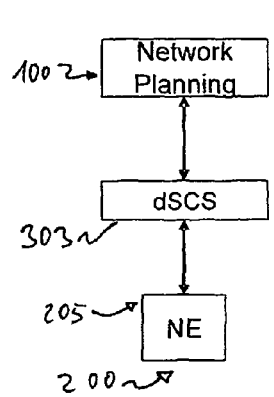
FIG. 3 shows a mapping of a method for managing a network element to a network management level of the 3GPP OAM architecture according to another exemplary embodiment.
Figure 3:
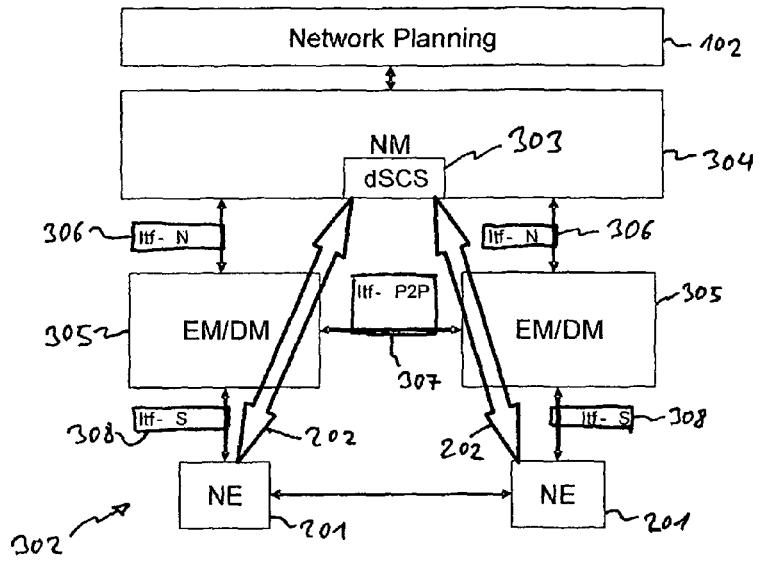

FIG. 3 shows a mapping of a method for managing a network equipment 201 to a network management level of the 3GPP OAM architecture according to an exemplary embodiment.

The schematic diagram 300 shows the dynamic self-configuration server 303 dSCS in the middle of the network planning layer 100 and the network equipment layer 205. The network diagram 302 shows the corresponding network planning function 102, which communicates to the network management 304. The network management 304 comprises the dSCS 303 which hosts the dRSCF 103.

The network management 304 is connected to the element manager/domain manager 305 via the interface LTF-N 306. FIG. 3 shows two EMs 305, which are connected via the interface LTF-P2P 307. The element manager EM 305 further is connected to network equipment 201 via the interface LTF-S 308. The network diagram 302 shows how the logical architecture of FIG. 2 can be mapped on the 3GPP OAM architecture. This shows a possible realization, where the dRSCF 103 or the dSCS 303 can be executed as hardware platform.

In FIG. 3 the dRSCF 103, 303 is located at NM level. The dRSCF 103, 303 is located at the NM or NM-level. The NE 201 communicates with the dRSCF via the first interface 202 which in this case is formed by a combination of the interface LTF-N 306 and LTF-S 308.

Figure 4:
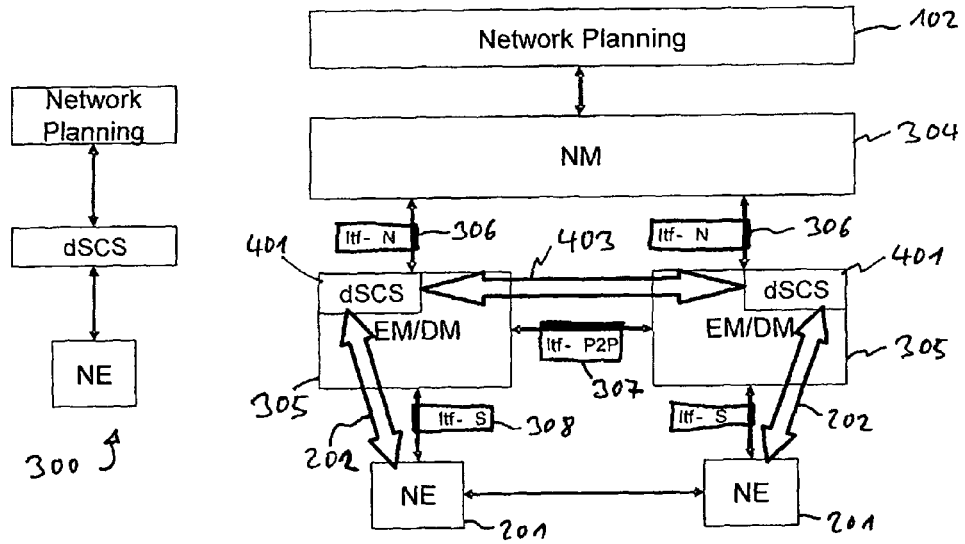
FIG. 4 shows a mapping for managing a network element to an element management level and/or domain management level of the 3GPP OAM architecture according to a further exemplary embodiment.

FIG. 4 shows a mapping of a method for managing a network equipment to an element management/domain management level according to an exemplary embodiment. FIG. 4 shows that the dSCS 401 is logically separated onto element manager 305. In other words, the dSCS 401 or the dRSCF 103 run on the element manager hardware. In this particular case the both dSCS 401 communicate via the interface 403 which comprises the interface LTF-P2P 307. The first interface 202 in that case comprises the LTF-S interface 308. If the dRSCF 103 or dSCS 401 is located at EM/DM or EM/DM-level, the NE 201 communicate with the dSCS 401 via the interface LTF-S 308. In this architecture the different dRSCF 401 makes change information on the LTF-P2P 307.

Figure 5:
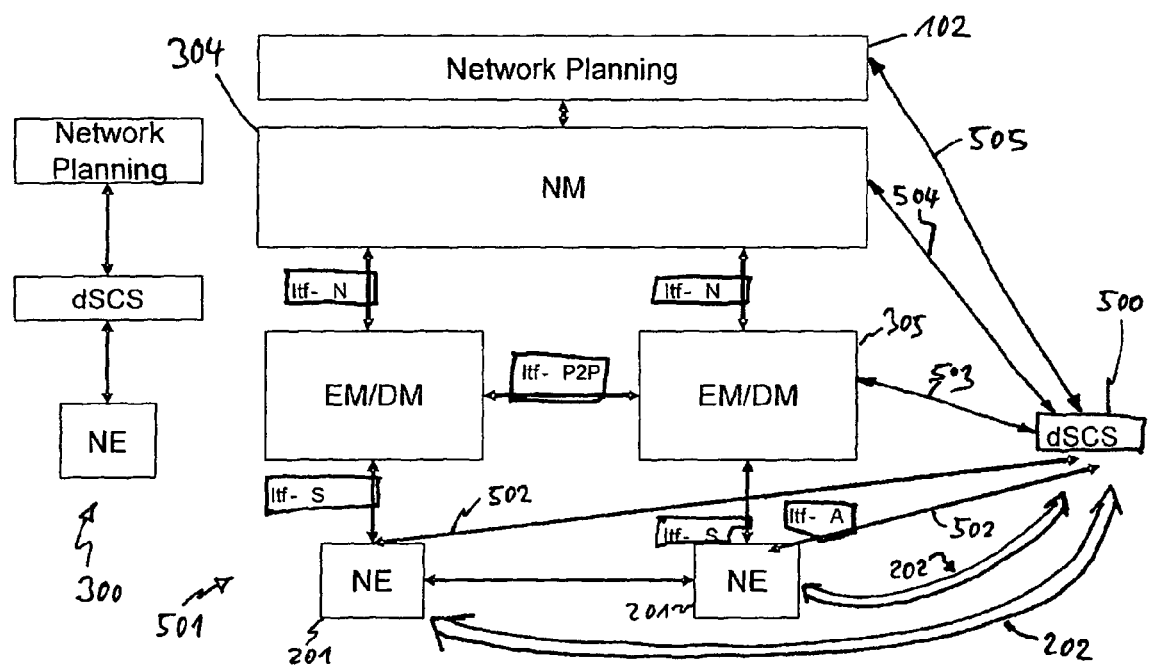
FIG. 5 shows a mapping of a method for managing a network element to a separate server according to a further exemplary embodiment.

FIG. 5 shows the mapping of a method for managing an NE to a separate server entity according to an exemplary embodiment. The dRSCF 103 or dSCS 500 can also be a new node, entity or server 500 in the network architecture 501. If the dRSCF 103 is realized as a separate entity the first interface 202 comprises the interface LTF-A 502. The dSCS 500 is also connected to the EM/DM 305 via connection 503 to the NM 304 via connection 504 and to the network planning 102 via connection 505.

As shown in FIG. 4 also in FIG. 2 there may be many instances of a dRSCF 103 within a radio network. The different instances running on different hardware entities, however are operating on the same network management level. Thus, the load, which is generated by a dRSCF 103 can be distributed over different physical hardware. To leverage the benefit of coordination between different applications, a coordination protocol or a synchronization protocol between the several dRSCF 103 instances may be employed. Such coordination protocol may be rsync or distributed database synchronization protocols. Rsync is a software application for Unix systems which synchronizes files and directories from one location to another while minimizing data transfer using delta encoding when appropriate. A mirroring takes place with only one transmission in each direction. rsync can copy or display directory contents and copy files, optionally using compression and recursion.

However, logically the dRSCF 103 always has to be seen as a centralized entity within a radio network domain.

In the following parameters will be described which parameters can be configured with a dRSCF 103 during the self-configuration phase or the self-configuration procedure of a new NE 201, e.g. eNodeB 201. These parameters are configured before the network equipment 201 starts to operate the radio interface 116 and before the NE 201 carries traffic generated by user equipment 115. The radio interface 116 is an interface between the radio network and the fixed network.

The dRSCF assigns a plurality of parameter to the radio configuration dynamically. As an example in an LTE network the cell identifier (PHY-CID) is dynamically assigned to cells supported by the new eNodeB 201. The assignment of a PHY-CID is for example based on the GEO location or the measurements reported from the eNodeB 201 to the dRSCF about the radio environment of the eNodeB 201 i.e. the signal strength of neighboring nodes.

Furthermore, in an LTE network a global cell identifier (GCID) is dynamically assigned to cells supported by the new eNodeB 201. Furthermore, an initial set of adjacencies is dynamically generated based on for example the GEO location or the measurements of the new eNodeB of the radio environment of the eNodeB.

Other parameters may not be influenced by the dRSCF 103 and thus these parameters are related for example from the database 208 to the network equipment 201. An example for radio configuration parameters which are related to the NE 201 are the mobile country code (MCC) and the mobile network code (MNC).

Another sort of parameters are parameters which dynamically are resolved by the dRSCF 103 or parameters which dynamically are mapped by the dRSCF 103 from one configuration parameter into another configuration parameter. For example, in an LTE network a PHY-CID is dynamically mapped by the dRSCF to a GCID, preferably, if the PHY-CID is changed during operation.

The PHY-CID is reported to the dRSCF 103 by the new eNodeB 201 for a discovered neighbor cell.

Furthermore, the GCID of a discovered neighbor cell is mapped by the dRSCF 103 to an IP address of the eNodeB, which eNodeB 201 supports the cell which is identified by the GCID. The IP address is required to allow the new eNodeB 201 to setup an X2 connection to the eNodeB 201 supporting the discovered neighbor cell. The X2 interface may base on the IP protocol and thus the availability of an IP address allows setting up the X2 connection.

Furthermore, the dRSCF 103 may be used as a policy decision point, wherein the policy enforcement point is located within the network. Alternatively the dRSCF 103 may form the functionality of the policy decision point (central determination of the policy and distribution to i.e. an NE) in the policy enforcement point (local enforcement e.g. in the NE).

Thus, the dRSCF 103 provides dynamic enforcement of an operator policy or an OAM policy. Such a policy may be a restriction configured by the operator. Examples for dynamic enforcement in an LTE network may be the enforcement of a blacklist for neighbor establishment. In a LTE automatic neighbor relationship (ANR) mechanism which is a distributed approach, a centralized blacklist is employed to reflect constraints by the operator with respect to the establishment of the neighborships. The dRSCF 103 concept may be employed in two different ways.

According to one aspect, a blacklist may be distributed to NEs 201 initially when the corresponding NE 201 is integrated into the network. Furthermore, the blacklist is distributed to the corresponding NE 201 when updates to the blacklist are made at the planning/OAM level, i.e. when new information is available in the database 208. Thus, the enforcement point is at the NE 201. In the enforcement point the desired neighborship is checked against the blacklist. Since the enforcement point is on the NE, performance of the NE is used to perform the check against the blacklist.

A second approach is that every time when a neighborship should be established, the NE 201 sends a desired neighborship request to the dSCS 401, 303, 500 or dRSCF 103. In the dSCS 401, 303, 500 neighborship is checked against the blacklist and thus a centralized enforcement point is created in the dRSCF 103.

In the case that the dRSCF 103 is used during operation for reconfiguration purposes for the network, different applications may be supported by the dRSCF. One application supported by the dRSCF 103 may be dynamic resolution or dynamic mapping of one configuration parameter into another parameter. In the LTE network example may be a mapping from a PHY-CID to the GCID is conducted. The PHY-CID is reported to the dRSCF 103 by an eNODEB 201 for a newly discovered neighbor cell. The neighbor cell is discovered by a user equipment which is connected to a cell supported by the eNODEB which reports the discovery to the dRSCF 103.

Additionally the mapping of the GCID of a discovered neighbor cell to the IP address of the eNODEB 201 which eNODEB 201 supports the identified cell which cell is identified by the GCID. The IP address is required to allow the new eNODEB 201 to set up an X2 connection to the eNODEB supporting the discovered neighbor cell.

The dRSCF 103 may also comprise a database, wherein some data can be stored. For example, an association of {eNODEB-ID (identifier of an eNODEB 201), a GEO location, a eNODEB-IP address (IP address of an eNODEB), SET OF {global CID, PHY-CID}} can be stored. This association of different parameters may be used, for example for mapping the GCID to the corresponding eNODEB-IP address. If no GEO location is reported belonging to the new eNODEB to the dRSCF, but if the physic PHY-CID of cells seen by the new eNODEB is reported to the dRSCF 103, the dRSCF 103 can match this PHY-CID pattern to a stored PHY-CID pattern in the database of the dRSCF 103. By this matching of the two PHY-CID an approximate GEO location may be identified using data related to the geo-location and pyy-CID of the cells. Thus, for incoming phy-CID pattern a GEO-location may be identified.

The deployment of the centralized dRSCF 103 allows to realize a synergy between different applications since they are hosted on the same single dSCS. Thus the dRSCF 103 has a complete view over the network and may react very quickly to changes in the configuration. For example, the dynamic enforcement of operator policies by taking into account several applications as phyID assignment, neighbor ship establishment benefit from such synergies. Is it on purpose that we supply a reference from a competitor or should we rather supply an own one ?

A centralized location of the dRSCF avoids complicate distribution algorithms.

As a centralized dynamic approach has an advantage over distributed algorithm. The centralized dRSCF 103 may allow replacing static, offline and manual preparation of radio configuration data. The centralized dRSCF 103 may avoid a slow regular configuration work cycle comprising aligning of all data, recomputing a network plan/configuration offline and roll out of the configuration.

The centralized dRSCF 103 may allow determining the radio configuration of a new eNODEB 201 is part of the self-configuration process. Thus planning personnel may be used for other tasks than network planning.

The centralized dRSCF 103 furthermore may efficiently integrate configuration and state data, which are generated inside the network, this data generated at a planning/OAM level and provided via database 208 which is at planning/OAM level.

The centralized dRSCF 103 may always keep up to date information on the current network state to the state so that such, that the configuration for the new eNODEB 201 may always be based sufficiently on the latest network data. The information about the network may always be on a single centralized point within the network.

Figure 6:
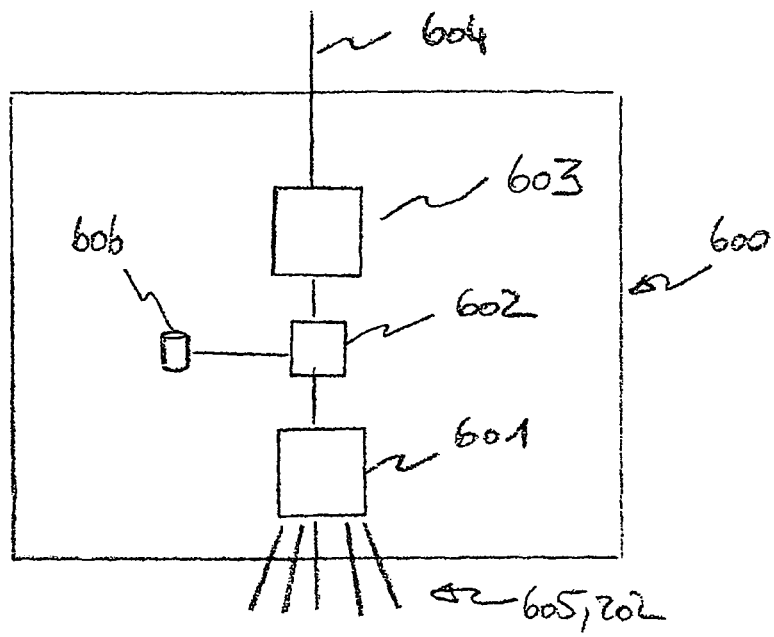
FIG. 6 shows a managing apparatus according to an other exemplary embodiment.

FIG. 6 shows a managing apparatus for managing a network element according to an exemplary embodiment. The managing apparatus 600 comprises a receiving device 601, a configuration generating device 602 and a distributing device 603. Furthermore, the managing apparatus comprises a second interface 604 and a plurality of first interfaces 605.

The configuration generating device 602 is connected to the receiving device 601 and to the distributing device. The receiving device 601 is adapted to receive (Achtung 603 and 601 vertauschen) field data via at least one of the first interfaces 605. The configuration generating device 602 is adapted to compare network status data and the field data such that the difference between network status data and field data can be determined. The network status data is stored in the database 606 which is connected to the configuration generating device.

The configuration generating device 602 is further adapted to determine a corresponding network element for receiving the configuration data. The distributing device 601 is adapted to distribute the configuration data via the first interface to a corresponding network element. In other words, the configuration data only has to be distributed to such network equipment which is affected by a generated configuration. Network equipment, which is not shown in FIG. 6 would be connected to the first interface 605, 202.

Figure 7:
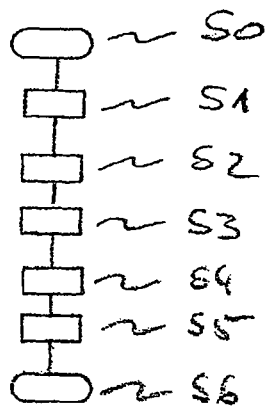
FIG. 7 shows a method for managing a network element according to an other exemplary embodiment.

FIG. 7 shows a flow-chart for a method for managing a network element according to an exemplary embodiment. The method starts in step S0 that a method is initialized. In step S1 via a first interface field data is received. The received field data is compared or correlated with available network status data. The network status data reflects the actual configuration of a network. A difference between the network status data and the field data may be detected and in step S3 configuration data is generated such, that the configuration data are adapted to align the network status data and the field data. The network status data may show that a newly connected network element does not have an IP address and thus an IP address is configured and provided to the newly connected network element.

A network element 201 which has to receive the amended configuration data is determined in step S4 and in step S5 the configuration data is distributed via a first interface to the corresponding network elements. The method ends in step S6.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for configuring a network element that is an element of a radio access network (RAN), the method comprising:

sending a request to a management apparatus for an IP address and receiving an IP address via a first interface from the management apparatus;

setting up a link via the first interface to the management apparatus;

receiving software via the first interface from the management apparatus; and performing, by the network element, a self test;

detecting changes of at least one radio configuration parameter;

providing information about the change of the at least one radio configuration parameter to the management apparatus; and receiving generated configuration data at the network element via the first interface from the management apparatus when the network element is affected by the generated configuration data, wherein the generated configuration data comprises at least one self-configuration parameter selected from the group consisting of an IP address of the network element, information about an IP environment of the network element, a frequency, a code, a physical cell identifier, a global cell identifier, an adjacency, a radio configuration parameter for the network element, a mapping parameter from a physical cell identifier to a global cell identifier, a mapping parameter of a global cell identifier to an IP address and a blacklist.

2. The method of claim 1, further comprising:
- detecting a desire to establish a neighbour relationship with another network element; and
- requesting the management apparatus to allow establishment of the neighbour relation.

3. The method of claim 1, wherein the network element is an element of a Radio Access Network.

4. A network element that is an element of a radio access network (RAN), the network element comprising:
- a receiving device; and
- a configuration device,
- wherein the receiving device is connected to the configuration device,
- wherein the configuration device requests an IP address from a management apparatus,
- wherein the receiving device receives an IP address via a first interface from the management apparatus,
- wherein the receiving device receives software via the first interface from the management apparatus,
- wherein the configuration device sets up a link via the first interface to the management apparatus,
- wherein the configuration device performs a self test,
- wherein the configuration device detects changes of at least one radio configuration parameter,
- wherein the configuration device provides information about the change of the at least one radio configuration parameter to the management apparatus,
- wherein the receiving device receives generated configuration data at the network element via the first interface from the management apparatus when the network element is affected by the generated configuration data, and
- wherein the configuration data comprises at least one self-configuration parameter selected from the group consisting of an IP address of the network element, information about an IP environment of the network element, a frequency, a code, a physical cell identifier, a global cell identifier, an adjacency, a radio configuration parameter for the network element, a mapping parameter from a physical cell identifier to a global cell identifier, a mapping parameter of a global cell identifier to an IP address and a blacklist.

5. The network element of claim 4, wherein the network element is at least one network element selected from the group consisting of a base station, a NodeB, an eNodeB, a home base station and a femto access point.

6. The network element of claim 4, wherein:
- the network element detects a desire to establish a neighbour relationship with another network element; and
- the network element requests the management apparatus to allow establishment of the neighbour relation.

7. The network element of claim 4, wherein the network element is an element of a Radio Access Network.

\* \* \* \* \*